US009785851B1

(12) United States Patent
Torek et al.

(10) Patent No.: US 9,785,851 B1
(45) Date of Patent: Oct. 10, 2017

(54) SCRAP SORTING SYSTEM

(71) Applicant: Huron Valley Steel Corporation, Trenton, MI (US)

(72) Inventors: Paul Torek, Ann Arbor, MI (US); Benjamin Aubuchon, Rockwood, MI (US); Kalyani Chaganti, Canton, MI (US)

(73) Assignee: Huron Valley Steel Corporation, Trenton, MI (US)

(*) Notice: Subject to any disclaimer, the term of this patent is extended or adjusted under 35 U.S.C. 154(b) by 0 days.

(21) Appl. No.: 15/198,159

(22) Filed: Jun. 30, 2016

(51) Int. Cl.
| | |
|---|---|
| *B07C 5/342* | (2006.01) |
| *G06K 9/20* | (2006.01) |
| *G06K 9/46* | (2006.01) |
| *G06K 9/42* | (2006.01) |
| *G06K 9/62* | (2006.01) |
| *B07C 5/36* | (2006.01) |

(52) U.S. Cl.
CPC .......... *G06K 9/2036* (2013.01); *B07C 5/342* (2013.01); *B07C 5/368* (2013.01); *G06K 9/42* (2013.01); *G06K 9/4642* (2013.01); *G06K 9/4652* (2013.01); *G06K 9/628* (2013.01); *G06K 9/6269* (2013.01); *B07C 2501/0018* (2013.01); *B07C 2501/0054* (2013.01); *G06K 2209/19* (2013.01)

(58) Field of Classification Search
CPC ...... G06K 9/42; G06K 9/4642; G06K 9/4652; G06K 9/628; G06K 9/6269; B07C 5/342; B07C 5/368
USPC .......................... 209/580, 587; 250/205, 223
See application file for complete search history.

(56) References Cited

U.S. PATENT DOCUMENTS

| | | | |
|---|---|---|---|
| 2,717,086 | A | 9/1955 | Bush |
| 3,928,183 | A | 12/1975 | Asfour |

(Continued)

FOREIGN PATENT DOCUMENTS

| | | |
|---|---|---|
| CA | 2050608 A1 | 3/1992 |
| DE | 4302283 A1 | 7/1994 |

(Continued)

OTHER PUBLICATIONS

Sabsabi et al., "Quantitative Analysis of Aluminum Alloys by Laser-Induced Breakdown Spectroscopy and Plasma Characterization", Society for Applied Spectroscopy, vol. 49, No. 4, 1995, pp. 499-507.

(Continued)

*Primary Examiner* — Terrell Matthews
(74) *Attorney, Agent, or Firm* — Brooks Kushman P.C.

(57) ABSTRACT

A system and a method of sorting scrap particles includes imaging a moving conveyor containing scrap particles using a vision system to create an image. A computer analyzes the image as a matrix of cells, identifies cells in the matrix containing a particle, and calculates a color input for the particle from a color model by determining color components for each cell associated with the particle. A light beam is directed to the particle on the conveyor downstream of the vision system, and at least one emitted band of light from the particle is isolated and detected at a selected frequency band to provide spectral data for the particle. The computer generates a vector for the particle containing the color input and the spectral data, and classifies the particle into one of at least two classifications of a material as a function of the vector.

20 Claims, 10 Drawing Sheets

(56) References Cited

U.S. PATENT DOCUMENTS

| | | |
|---|---|---|
| 3,977,526 A | 8/1976 | Gordon et al. |
| 4,466,544 A | 8/1984 | Satake et al. |
| 4,493,420 A | 1/1985 | Dennis |
| 4,504,888 A | 3/1985 | Rosenthal |
| 4,513,868 A | 4/1985 | Culling et al. |
| 4,687,107 A | 8/1987 | Brown et al. |
| 4,693,378 A | 9/1987 | Azegami et al. |
| 4,699,273 A | 10/1987 | Suggi-Liverani et al. |
| 4,745,272 A | 5/1988 | Andreatti, Jr. |
| 4,799,596 A | 1/1989 | Mallant |
| 4,848,590 A | 7/1989 | Kelly |
| 5,021,645 A | 6/1991 | Satula et al. |
| 5,034,613 A | 7/1991 | Denk et al. |
| 5,042,947 A | 8/1991 | Pötzschke et al. |
| 5,060,871 A | 10/1991 | Brassinga et al. |
| 5,085,325 A | 2/1992 | Jones et al. |
| 5,090,576 A | 2/1992 | Menten |
| 5,101,101 A | 3/1992 | Sawamura |
| 5,305,894 A | 4/1994 | McGarvey |
| 5,316,983 A | 5/1994 | Fujimori et al. |
| 5,381,224 A | 1/1995 | Dixon et al. |
| 5,520,290 A * | 5/1996 | Kumar ............... B07C 5/3422 198/349.1 |
| 5,528,360 A | 6/1996 | Kohno |
| 5,628,410 A | 5/1997 | Smith et al. |
| 5,676,256 A * | 10/1997 | Kumar ............... B07C 5/3422 198/349.1 |
| 5,813,543 A | 9/1998 | Gesing et al. |
| 5,903,341 A | 5/1999 | Perry et al. |
| 5,911,327 A * | 6/1999 | Tanaka ............... B07C 5/3425 209/3.2 |
| 6,008,896 A | 12/1999 | Sabsabi et al. |
| 6,008,897 A | 12/1999 | Sabsabi et al. |
| 6,060,677 A | 5/2000 | Ulrichsen et al. |
| 6,366,353 B1 | 4/2002 | Brown et al. |
| 6,466,309 B1 | 10/2002 | Kossakovski et al. |
| 6,545,240 B2 * | 4/2003 | Kumar ............... B07C 5/3425 209/579 |
| 6,795,179 B2 | 9/2004 | Kumar |
| 7,816,616 B2 | 10/2010 | Kenny et al. |
| 7,842,896 B1 | 11/2010 | Calcoen et al. |
| 7,886,915 B2 | 2/2011 | Shulman |
| 7,924,414 B2 | 4/2011 | Mound |
| 7,938,330 B2 * | 5/2011 | Kiuchi ............... G06K 7/1417 235/454 |
| 8,125,627 B2 | 2/2012 | Dottery et al. |
| 8,170,291 B2 * | 5/2012 | Zimmerman ...... G06K 9/00161 382/101 |
| 8,476,545 B2 | 7/2013 | Sommer et al. |
| 8,620,054 B2 * | 12/2013 | Leroux ............... G06T 11/006 382/131 |
| 8,775,428 B2 * | 7/2014 | Birdwell ........... G06F 17/30333 707/737 |
| 8,861,675 B2 | 10/2014 | Sommer, Jr. et al. |
| 9,486,839 B2 * | 11/2016 | Torek ..................... B07C 5/346 |
| 2003/0034281 A1 * | 2/2003 | Kumar ............... B07C 5/3425 209/579 |
| 2013/0141115 A1 | 6/2013 | Bourely et al. |
| 2013/0249943 A1 | 9/2013 | Chen et al. |
| 2014/0125965 A1 | 5/2014 | Nagli et al. |
| 2014/0231314 A1 | 8/2014 | Pillkahn |
| 2014/0260801 A1 | 9/2014 | Wellwood et al. |
| 2016/0187199 A1 * | 6/2016 | Brunk .................. G01J 3/2823 348/89 |

FOREIGN PATENT DOCUMENTS

| | | |
|---|---|---|
| DE | 4426475 A1 | 2/1995 |
| DE | 4426490 A1 | 2/1995 |
| DE | 19949656 A1 | 4/2001 |
| DE | 10304337 A1 | 8/2004 |
| DE | 102005060172 B3 | 3/2007 |
| DE | 102011012592 A1 | 8/2012 |
| DE | 102012208865 A1 | 11/2013 |
| DE | 102012217676 A1 | 3/2014 |
| DE | 102012216159 A1 | 4/2014 |
| EP | 0231027 A2 | 8/1987 |
| EP | 0652430 A1 | 5/1995 |
| EP | 1443319 A1 | 8/2004 |
| WO | 8801379 A1 | 2/1988 |
| WO | 9303863 A1 | 3/1993 |
| WO | 0070331 A1 | 11/2000 |
| WO | 2007068237 A1 | 6/2007 |
| WO | 2011154646 A1 | 12/2011 |
| WO | 2011159269 A1 | 12/2011 |
| WO | 2013076428 A1 | 5/2013 |

OTHER PUBLICATIONS

Secopta, "MopaLIBS® Multi-element Analysis System", Berlin, Germany, 2 pages, available on-line on or before Mar. 8, 2016.

Werheit et al., "Fast single piece identification with a 3D scanning LIBS for aluminum cast and wrought alloys recycling", The Royal Society of Chemistry 2011, Aug. 23, 2011, 9 pages.

\* cited by examiner

SCRAP SORTING SYSTEM

TECHNICAL FIELD

Various embodiments relate to a method and a system for sorting scrap particles in a line operation.

BACKGROUND

Scrap metals are currently sorted at high speed or high volume using a conveyor belt or other line operations using a variety of techniques including: hand sorting by a line operator, air sorting, vibratory sorting, color based sorting, magnetic sorting, spectroscopic sorting, and the like. The scrap materials are typically shredded before sorting and require sorting to facilitate separation and reuse of materials in the scrap, for example, by sorting based on classification or type of material. By sorting, the scrap materials may be reused instead of going to a landfill or incinerator. Additionally, use of sorted scrap material leads to reduced pollution and emissions in comparison to refining virgin feedstock from ore or plastic from oil. Sorted scrap materials may be used in place of virgin feedstock by manufacturers if the quality of the sorted material meets a specified standard. The scrap materials may be classified as metals, plastics, and the like, and may also be further classified into types of metals, types of plastics, etc. For example, it may be desirable to classify and sort the scrap material into types of ferrous and non-ferrous metals, heavy metals, high value metals such as nickel or titanium, cast or wrought metals, and other various alloys.

SUMMARY

In an embodiment, a method of sorting scrap particles is provided. A moving conveyor containing scrap particles is imaged using a vision system to create an image corresponding to a timed location of the conveyor. A computer is employed to analyze the image as a matrix of cells, identify cells in the matrix containing a particle by distinguishing the particle from a background indicative of the conveyor, and calculate a color input for the particle from a color model by determining color components for each cell in the matrix associated with the particle, the color input calculated by inputting two color components from each cell of the matrix associated with the particle as a pair of discriminants into a calibration table, flagging the cell if the pair of discriminants is one of a predefined pair of discriminants, and calculating the color input by normalizing a summation of the flagged cells by a total number of cells associated with the particle. A light beam is generated and directed to the particle on the conveyor downstream of the vision system and within a target area using a scanner assembly including a beam deflector. At least one emitted band of light from the particle in the target area is isolated and measured at a selected frequency band using a detector to provide spectral data for the particle. The computer is employed to generate a vector for the particle containing the color input and the spectral data, and classify the particle into one of at least two classifications of a material as a function of the vector.

In another embodiment, a method of sorting scrap particles is provided. A moving conveyor containing scrap particles is imaged using a vision system to create an image corresponding to a timed location of the conveyor. A computer is employed to analyze the image as a matrix of cells, identify cells in the matrix containing a particle by distinguishing the particle from a background indicative of the conveyor, and calculate a color input for the particle from a color model by determining color components for each cell in the matrix associated with the particle. A light beam is generated and directed to the particle on the conveyor downstream of the vision system and within a target area using a scanner assembly including a beam deflector. At least one emitted band of light from the particle in the target area is isolated and measured at a selected frequency band using a detector to provide spectral data for the particle. The computer is employed to generate a vector for the particle containing the color input and the spectral data, and classify the particle into one of at least two classifications of a material as a function of the vector.

In yet another embodiment, a scanning system for sorting randomly positioned scrap material particles on a moving conveyor is provided. A vision system has a sensor and an illuminated predefined viewing area to image a conveyor passing therethrough at a time interval. A beam director receives a light beam from a source and re-directs the beam to a target scanner assembly having a beam deflector mounted in the path of the light beam to further direct the beam to a selected location within a two-dimensional target area. A focusing optical element mounted in the path of the light beam focuses the light beam and provides a generally uniform light power density along a focal surface. A spectral sensor is adjacent to the target. At least one controller receives and processes image data acquired from the vision system to identify a scrap particle on the conveyor in the viewing area, calculate a color input from a color model for the particle from an image taken by the visions system by applying a color criteria to the image, target a scrap particle in the target area and control the light beam director and target scanner assembly to direct the beam at the targeted scrap particle, determine spectral data for the particle based on a signal indicative of one or more selected frequency bands of light emitted from the particle in response to the light beam interacting with the particle, and classify the particle into a classification of material using a vector containing the color input and the spectral data.

DETAILED DESCRIPTION

As required, detailed embodiments of the present disclosure are provided herein; however, it is to be understood that the disclosed embodiments are examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
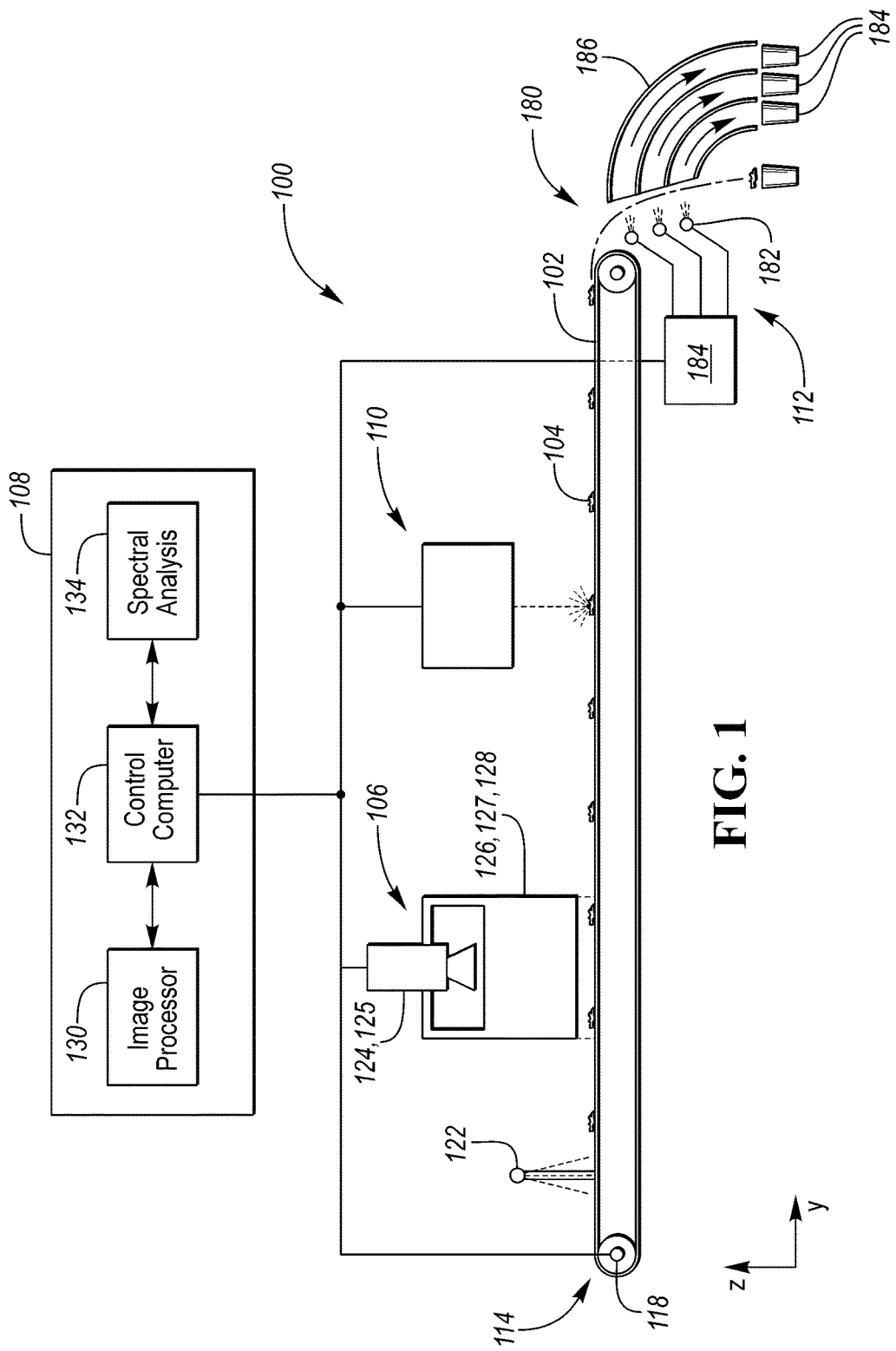
FIG. 1 illustrates a side schematic view of a sorting system according to an embodiment.
Figure 2:
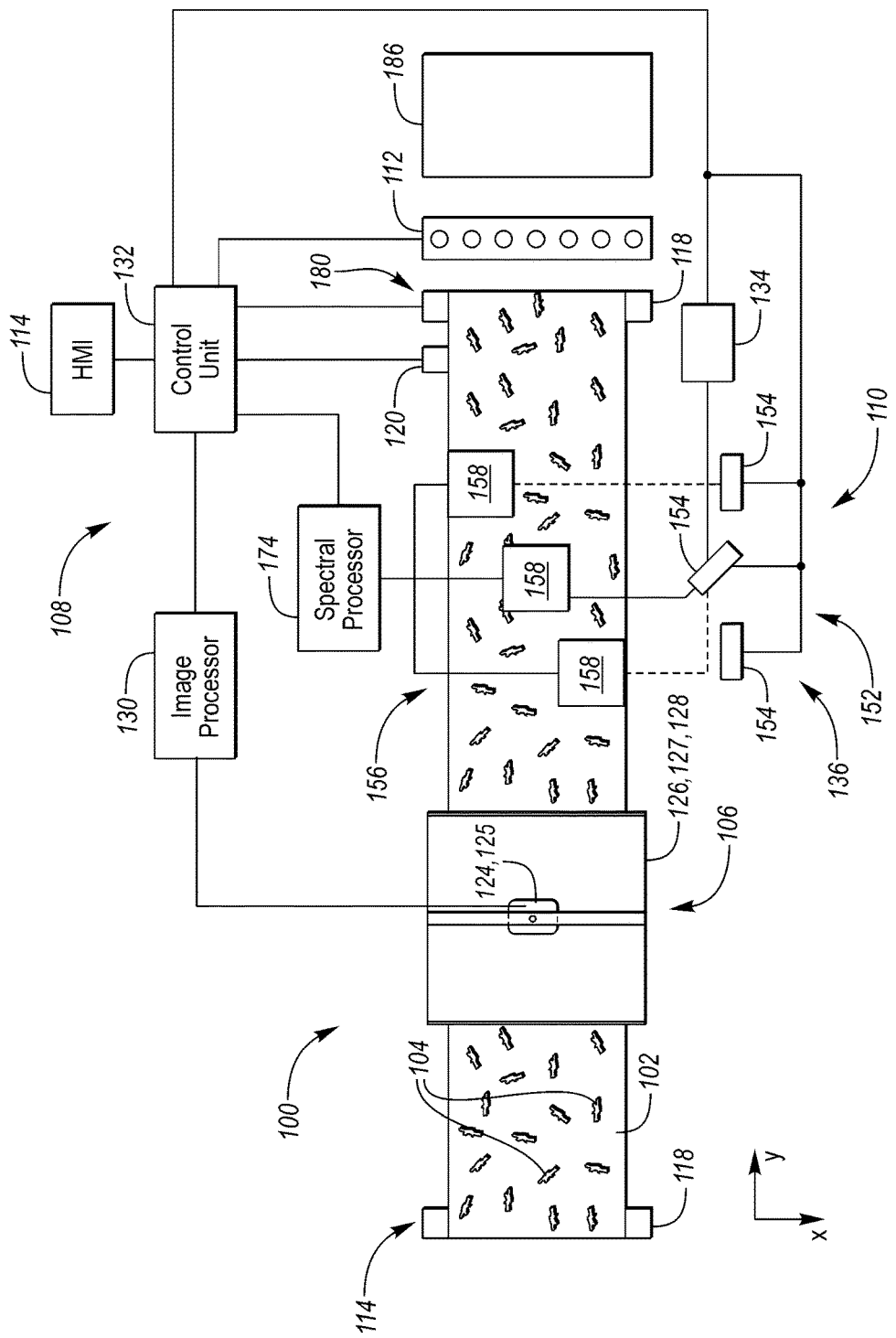
FIG. 2 illustrates a top schematic view of the sorting system of FIG. 1.
Figure 3:
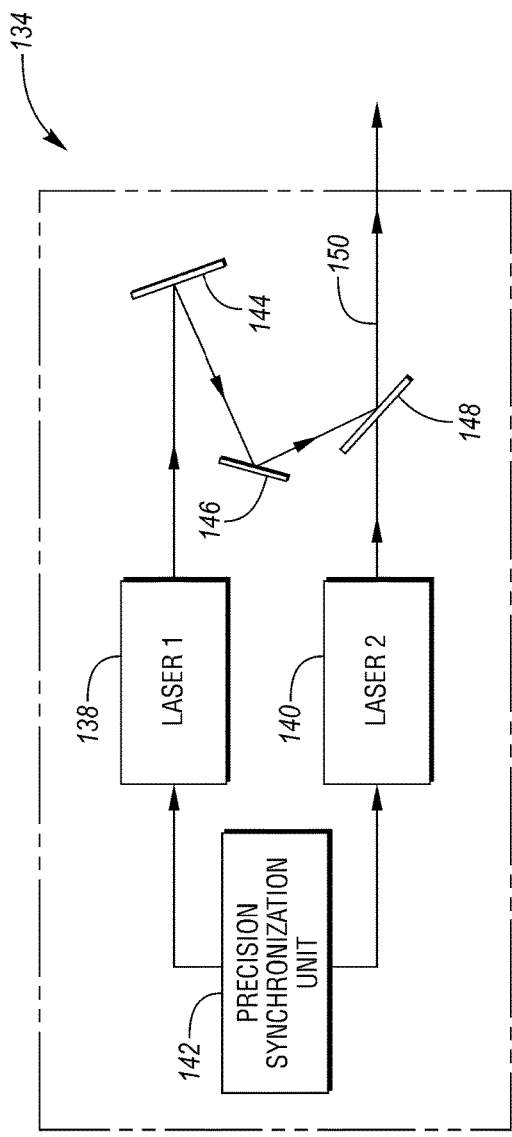
FIG. 3 illustrates a diagram of a laser system employing at least two synchronized lasers for use with the sorting system of FIG. 1 according to an embodiment.

FIGS. 1-2 illustrate a system 100 or apparatus for classifying scrap materials into two or more classifications of materials, and then sorting the materials into their assigned classification.

A conveyor belt 102, or other mechanism for moving objects along a path or in a direction, shown here as the y-direction, supports particles 104 to be sorted. The particles 104 to be sorted are made up of pieces of scrap materials, such as scrap materials from a vehicle, airplane, a recycling center; or other solid scrap materials as are known in the art. The materials 104 are typically broken up into smaller pieces on the order of centimeters or millimeters by a shredding process, or the like, before going through the sorting system 100 or a larger sorting facility. The particles 104 may be randomly positioned and oriented on the conveyor 102, have random and widely varying shapes, and have varying properties, such as a wide range of reflectivity.

The system 100 classifies and sorts the particles into two or more selected categories of materials. In one example, a binary sort is performed to sort the materials 104 into two categories. In another example, the materials are sorted into three or more categories of materials. The conveyor belt 102 extends width-wise in the x-direction, and pieces or particles of material 104 are positioned at random on the belt 102. In various examples, different scrap materials may be sorted, e.g. types of mixed metals, cast versus wrought, alloys, etc.

The system 100 has a vision system 106 that images the belt 102 as it passes through a viewing area of the vision system 106. In one example, the vision system 106 provides a color image in the visible spectrum. In other examples, the vision system 106 provides another multi-channel image. A control unit 108 receives the images from the vision system 106, and uses the images to locate particles 104 of material on the belt and track the particles as they move along the belt. The control unit 108 also uses the imaging data to determine color data associated with each particle 104 on the belt 102. The control unit 108 may be provided by a networked computer system employing a plurality of processors to achieve a high-speed, multi-tasking environment in which processing takes place continuously and simultaneously on a number of different processors. In the control unit 108, each processor in turn is capable of providing a multi-tasking environment where a number of functionally different programs could be simultaneously active, sharing the processor on a priority and need basis. The choice of implementation of hardware to support the functions identified in the process groups may also depend upon the size and speed of the system, as well as upon the categories being sorted.

The system 100 has a laser spectroscopic system 110 that has one or more lasers and a beam steering system. Light pulses from the lasers are directed by the beam steering system to known particle locations as the particles pass through the system 110 on the belt 102. A laser beam or pulse interacts with the particle to form a plasma. The system 110 measures light emitted by the plasma, for example, in one or more specified frequency bands, to provide a signal indicative of spectral data to the control unit 108.

The control unit 108 uses the color data and the spectral data for each particle and conducts a multi-discriminant analysis for the particle to classify the particle into one of two or more preselected classifications. Based on the classification outcome, the control unit 108 controls a sorting device 112 to sort the particles 104 based on their associated classifications. The control unit 108 may also include one or more display screens and a human machine interface 114, for use in controlling the system 100 during operation and also for use in calibration or system setup.

The particles 104 of scrap material are provided to a first end region 116 of the belt 102. The belt 102 is moved using one or more motors and support rollers 118. The control unit 108 controls the motor(s) 118 to control the movement and speed of the belt 102. The control unit 108 may include one or more position sensors 120 to determine a location and timing of the belt 102 for use locating and tracking particles 104 as they move through the system on the belt. In one example, the conveyor 102 is linearly moved at a speed on the order of 200 to 400 feet per minute, although other speeds are contemplated.

The particles 104 on the belt 102 may pass under a cleaning system or device 122. The cleaning system 122 extends across the width of the belt 102 and may include a pressurized air source to remove dust and/or a wetting device to provide a spray of liquid, e.g. water, onto the surface of the conveyor 102 to create a darkened, more uniform surface of the conveyor as the background.

The belt 102 passes through a vision system 106, which includes an imaging device 124 to image the material as it moves through the system 106. The vision system 106 creates an image of a region of the belt 102 based on a viewing area of the associated imaging device 124, and associates the image with the belt 102 timing.

The vision system 106 includes an imaging device 124 and a lighting system 126 that the belt 102 and particles 104 pass under. The imaging device 124 may be a camera that has a digital color sensor, such as a charge coupled device (CCD) or complimentary-metal-oxide-semiconductor (CMOS) sensor. In one example, the imaging device 124 is a linescan camera that scans with sufficient frequency to provide a continuous feed of sequential image frames of the conveyor 102, and is a three chip, RGB color CCD camera. In other examples, the imaging device may include a CMOS sensor or another sensor, or may provide an image with using another color model, such as HSV and HSL or other channels. The camera 124 has an associated viewing area that is focused on the belt 102. The camera 124 may be a multispectral or hyperspectral camera providing ultraviolet, visible, and/or infrared channels.

The vision system 106 may also include a three-dimensional (3-D) imaging device 125 with its own lighting system 127. The 3-D imaging device 125 may be a camera or pair of cameras that views a laser line profile generated by a line laser 127 and uses the vertical displacement of the line laser to determine the top surface profile of the particle 104. In another embodiment, it may be a time-of-flight laser ranging system coupled to a rapid one dimensional (1-D) scanning mirror that scans the width of the belt 102. Alternatively, a stereo/dual camera 3D system or any other 3D imaging system may be used as is known in the art.

The lighting system 126 illuminates the viewing area of the belt 102 to provide a controlled uniform illumination of the viewing area for the imaging device 124. The lighting system 126 may be provided with a shroud 128 that includes a frame that supports one or more lights emitting broadband visible light, such as fluorescent light bulbs, broadband LEDs or halogen light bulbs. The lighting system 126 may also include a cylindrical lens for collimation and uniform illumination and/or one or more diffuser panels positioned between the lights and the conveyor 102.

The control unit 108 controls the vision system 106 using information regarding the position of the conveyor 102, for example, using inputs from the position sensor 120, to determine the linear advancement of the conveyor belt 102 and the associated advancement of the scrap particles 104 on the belt. The control unit 108 may control the vision system 106 to acquire an image of the viewing area when the conveyor belt 102 has advanced a distance equal to the length of the viewing area.

The imaging device 124 includes an image detector or sensor that electronically records an image of the viewing area through which the scrap particles are conveyed by the conveyor 102. An image processing unit 130 is provided in the control unit to periodically acquire and process the images. The processor unit 130 includes logic for assembling each image from the linescan camera. The processor unit 130 may divide each image of the viewing area into a matrix of cells, and analyze the digital data corresponding to the image to determine locations of particles 104 on the conveyor 102 for use in the laser spectroscopic system 110 and separator device 112, and to determine a color input for each particle 104 for use in the classification and sorting process. The image processing unit 130 receives signal indicative of the position of the conveyor 102 and when to acquire an image such that the conveyor belt is imaged in a series of sequential images of discretized sections of the conveyor as it passes through the viewing area. The controller 132 and processor 130 of the control unit 108 may perform various analyses on each of the digital pixel values recorded for an image as described below. An example of a color-based visual sorting system is provided in U.S. Pat. No. 5,676,256, issued Oct. 14, 1997, the disclosure of which is incorporated in its entirety by reference herein.

The belt 102 then passes through the laser spectroscopic system 110. The laser spectroscopic system 110 may operate as a Laser-Induced Breakdown Spectroscopy (LIBS), Laser Spark Spectroscopy (LSS), or Laser-Induced Optical Emission Spectroscopy (LIOES) system, and uses a focused laser beam to vaporize and subsequently produce spectral line emissions from a sample material, such as a particle 104, to analyze the chemical composition of the particle 104. The LIBS system 110 provides optical emission data of the laser-induced plasmas of the particles after a LIBS interrogation to the control unit 108 for use in classifying and sorting the particles 104. An example of a laser-induced spectroscopy sorting system is provided in U.S. Pat. No. 6,545,240 B2, issued Apr. 8, 2003, the disclosure of which is incorporated in its entirety by reference herein.

The laser spectroscopic system 110 provides a laser system 134 with at least one laser generating a laser beam including at least one laser pulse, and in some examples a stream of a plurality of laser pulses, within a selected time interval, and at least one scanner assembly 136. The scanner assembly 136 is positioned between the laser 134 and the conveyor 102 with a positionable beam deflector to direct the laser pulses at a selected particle at any location in a selected target region on the conveyor 102 and a focusing element mounted to focus the beam and provide uniform laser power density along a plane generally coinciding with the conveyor. The system 110 further includes at least one light collector or detector for collecting light emitted by plasma produced from the particles 104 as they are irradiated by the laser pulses.

The laser system 134 includes at least one laser for providing at least one laser pulse, and in some examples a plurality of laser beam pulses, within a preselected time interval. In one example, the laser system 134 is provided by a pair of solid-state fixed frequency pulsed Q-switched Neodymium-yttrium aluminum garnet (commonly known as Nd-YAG) lasers 138, 140, a synchronizing unit 142, a pair of mirrors 144, 146, and a polarizing beam splitter 148 for combining suitably polarized pulse streams from each of lasers 138, 140 into a single selected path 150. Each of the lasers 138, 140 may be operated in a double pulse mode producing two pulses separated by 1-200 microseconds by Q-switching the laser twice during a flashlamp cycle. In one example, the laser pulses in a double pulse are separated by about 50 microseconds such that the laser system 134 with two lasers 138, 140 provides four pulses fired over a period of 150 microseconds. Based on the speed of the conveyor belt 102, the translational movement of a particle 104 during this time period is negligible such that all four pulses are directed to the same location and the same particle using a single scanner position. In further examples, the system 100 includes more than one laser system 134, or a laser system 134 delivering fewer or greater than four pulses to a particle. In another example, the laser system 134 delivers a laser shot from the two lasers with two pulses spaced by two microseconds, with the laser shots at 100 Hertz, or 50 Hertz interlaced.

In one example, the lasers 138, 140 are operated in a fixed frequency mode to generate pulses of predictable characterizations. In other examples, other lasers may be used that also generate sufficient laser pulses in a time span in a fixed frequency mode for use with the system 100 and without requiring repositioning the scanner.

The scanner assembly 136 is controlled by the control unit 108 to direct multiple laser pulses along a path to a target location associated with a particle in the target area. The scanner assembly 136 may include one or more sub-assemblies that are associated with different functions of the scanner assembly. In one example, each laser system 134 has an associated scanner assembly 136. The scanner assembly 136 may be configured to direct the laser beam both in the direction of travel of the conveyor 102 as well as transversely across the width of the conveyor 102 to provide for flexibility in targeting the particles 104 as they move with the conveyor 102.

The scanner assembly 136 includes a beam deflector sub-assembly 152 that includes at least one beam deflector 154 having a scanner with a controllable, positionable mirror. In one example, the beam deflector 154 is a positionable galvanometric scanner with a mirror. Each mirror may be rotated by the control unit 108 between a non-interfering position and an operable position where the laser pulses interact with the mirror. The beam deflector sub-assembly 152 directs and focuses laser beam pulses available at constant intervals from the laser 134 to selected positions at uniform power densities along a plane within a target area on the conveyor 102. The preselected time interval is chosen to be short enough to ablate a selected target spot on a detected scrap particle 104 that has been conveyed to that location with multiple pulses without repositioning the scanner 136. The mirror 154 of the detector sub-assembly 152 directs the laser pulses from an associated laser system 134 along a fixed path to a scanner sub-assembly 156. When no laser pulses are required by the system, the detector sub-assembly may redirect the laser pulses to a laser dump. If a set of laser pulses is required sooner than the pulses can be supplied by a first laser system, the mirror 154 may be repositioned to direct a set of multiple pulses from a second laser system along the same fixed path to one of the scanner sub-assemblies 156. By providing more than one, or a pool, of laser systems as well as more than one deflector sub-assembly, the frequency of laser pulses for use in the spectroscopic system may be increased beyond an available frequency rate of one multiple-pulse laser system.

The scanner sub-assembly 156 also includes beam deflectors 158 that receive the laser pulses along a fixed path from the beam deflector sub-assembly 136. In one example, multiple scanner sub-assemblies 156 are provided based on the density and speed of the particles 104 in the target area. Each scanner sub-assembly 156 may have an overlapping target area with an adjacent scanner sub-assembly. The scanner sub-assembly 156 includes beam deflectors 158, for example, positionable galvanometric scanners 160 which position associated mirrors 162 to direct laser pulses from the deflector sub-assembly 136 to a selected location and selected particle 104 within the target area as it moves on the conveyor 102 through the target area. The scanner sub-assembly 156 also includes a focusing element 164, such as a lens to focus the laser pulses. The lens 164 may be an F-Theta lens or similar focusing element that includes a distortion characteristic such that the image distance is proportional to the field angle and the scan is linear with the angular displacement of the scanning mirrors. In one example, the lens 164 is a telecentric F-Theta lens that also provides focusing of the laser pulses along an axis that is perpendicular to the scanning plane of the target area throughout the target area such that the angular relationship between the laser pulse stream and the particles' surface is consistent and does not depend upon the particles' location and uniformity of results is increased. In another example, the lens is part of a telescope typically consisting of at least one moving lens and one fixed lens. Using the surface profile information from the 3-D imaging device 125, together with the geometrical target distance, the focus point in the z-direction is adjusted for improved, uniform LIBS performance. Moreover, the selected location on the particle 104 may be chosen to be in a flat sub-region of the particle with minimal surface roughness, or other features known in the art to provide superior LIBS signals.

The system 100 may include one or more light collectors 166. The light collector 166 includes optical fibers distributed to collect light from the generated plasma, and is connected to a light distribution and spectral analyzer unit 168 to isolate and measure selected spectral components of the collected light. In one example, the light collector 166 includes a plurality of ultraviolet grade fused-silica optical fibers that are positioned to collect light from a plasma created as a result of laser pulses interacting with material of the scrap particles 104. The optical fibers may be supported by the scanner housings and are distributed to collect light over each of the target areas. The optical fibers provide the light emitted by the plasma to the light distribution and spectral analysis unit.

The light distribution and spectral analysis unit 168 may include an integrating chamber to provide a uniform distribution of the collected light to the one or more spectral filters. In one example, the spectral filters are provided by monochromator systems 170 that transmit a narrow band of light (approximately 0.05 to 0.1 nanometers wavelength) centered around a selected frequency to a detector 172. In another example, the spectral filters are provided by a polychromator. The detector 172 provides a signal to a spectral processor 174 in the control unit 108 that is indicative of the intensity of the emission from the associated monochromator. In various examples, each detector 172 is provided by a photomultiplier tube (PMT), a photodiode, an intensified diode array, a CCD detector, or the like. In one example, the light collectors 166 are used for a spectral analysis unit 168 with a PMT detector 172. In another example, the light collectors 166 are omitted or replaced with a mirror for an open air connection to a CCD detector 172.

The control unit 108 uses at least the color input and the spectral data as described below to classify each particle 104 into one of a plurality of classifications. The control unit 108 then controls the separator unit 112, using the classification for each particle 104, the location of the particles, and the conveyor 102 position to sort and separate the particles 104.

The system 100 includes a separator unit 112 at a second end 180 of the conveyor 102. The separator unit 112 includes a system of ejectors 182 used to separate the particles 104 based on their classification. The separator unit 112 has a separator controller 184 that is in communication with the control unit 108 and the position sensor 120 to selectively activate the appropriate ejectors 182 to separate selected scrap particles located on the conveyor which have reached the discharge end 180 of the belt. The ejectors 182 may be used to sort the particles 104 into two categories, three categories, or any other number of categories of materials. The ejectors 182 may be pneumatic, mechanical, or other as is known in the art. In one example, the ejectors 182 are air nozzles that are selectively activated to direct a jet of air onto selected scrap particles to alter the trajectory of the selected particle as it leaves the conveyor belt so that the particles are selectively directed and sorted into separate bins 184, for example using a splitter box 186.

A recycle loop may also be present in the system 100. If present, the recycle loop takes particles 104 that could not be classified and reroutes them through the system 100 for rescanning and resorting into a category.

Figure 5:
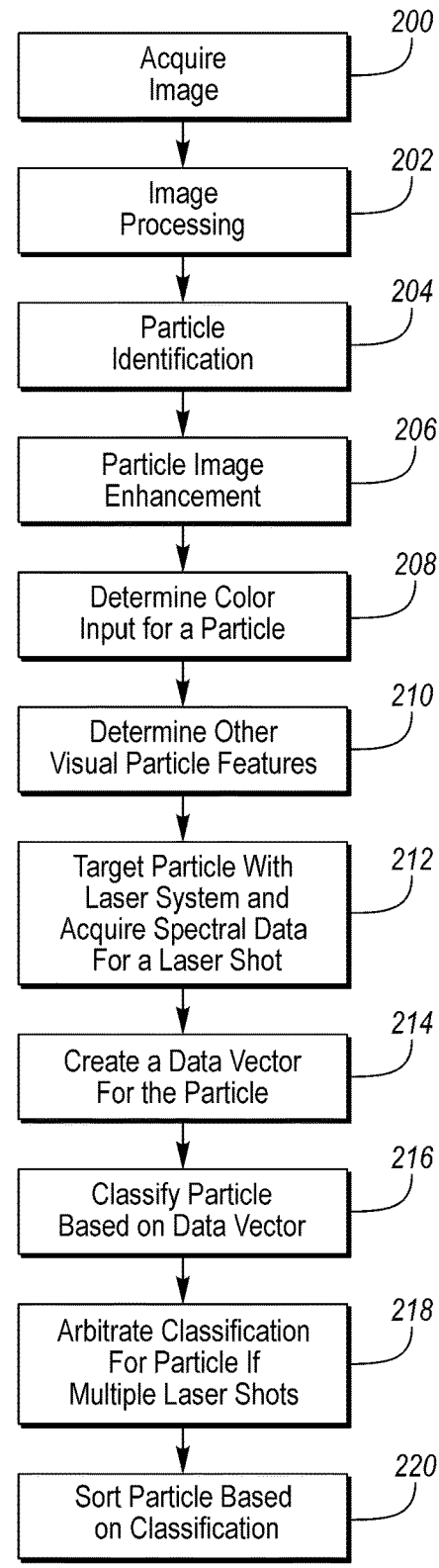
FIG. 5 illustrates a flow chart illustrating a method for classifying scrap material using the system of FIG. 1.

Referring to FIG. 5, a method is shown for classifying particles using the control unit 108 of the system 100 as shown in FIGS. 1-2. In other embodiments, various steps in the method may be combined, rearranged, or omitted. The control unit 108 provides a line trigger signal to the camera to acquire a single line based on the position of the conveyor 102. In response to receiving the line trigger signal, the camera acquires a line scan image at 200.

The control unit 108 forms a matrix associated with the line scan image that is also linked to the position or coordinates of the belt 102 for use by the separator unit 112. The matrix overlays the image such that each cell in the matrix is associated with one or more pixels in the image. In one example, the matrix may have a cell associated with each pixel. In other examples, the matrix may have one cell associated with multiple adjacent pixels.

The image processor 130 receives a signal from the camera 124 that includes a series of RGB signals corresponding to each of the red, green and blue segments or color components of the viewing area as detected by the sensor in the camera 124. In other examples, other color signals may be provided to the image processor that are based on a different color space and color model to indicate a color for the image that includes at least three color components or other channels may be provided from the camera, e.g. grayscale, non-visible spectra, and the like. The RGB signals from the camera 124 are assembled or converted by the image processor 130 to three arrays, with each array corresponding to one of the red, green, and blue images. The image processor 130 may assemble the line scan image data to form a larger, composite image or matrix as the array. Each array may be 1024×1024 digital pixel values (from 0 to 255) for each of the red, green and blue images, and may be 24 bit. The arrays may be overlaid to provide a color image with three channels, or RGB channels, for each pixel or for each cell in the matrix. The RGB values are provided as a dataset of [R, G, B] values, each value ranging from 0 to 255, to the pixel or cell.

At 202, the image processor 130 may transform the arrays, image, or matrix using a fast Fourier transform (FFT), reject high frequency noise and/or reject specific frequencies in the X- and/or Y-directions representing belt pattern noise, and then apply an inverse FFT to restore the improved arrays, image or matrix. The control unit 108 is employed to reduce noise on the image by transforming the image via a FFT to create a representation of the image in a frequency domain, remove at least one specified frequency from the representation, and transforming the representation back to the image via an inverse FFT.

At 202, the control unit 108 may additionally normalize each of the color channels for the image, e.g. the R image or array, the B image or array, and the G image or array for an RGB color space, to correct any spectral imbalances in the light sources. For example, each pixel in the image may have the R value, G value, and/or B value modified using look-up or calibration tables associated with each color. The calibration or look-up tables for the color correction of the image may be obtained based on a calibration process using a neutral background, a calibration card, or the like.

At 204, the control unit 108 identifies cells in the matrix or pixels in the image that may contain a particle 104 by distinguishing the particle from a background indicative of the conveyor 102. The particle 104 is distinguished from the background by applying a threshold on at least one channel of the image or matrix and flagging a pixel or cell when a value of the at least one channel exceeds the threshold to indicate the presence of a particle 104.

The image processor 130 additionally determines targeting information for each particle 104 for use by the laser system 110. In one example, the image processor 130 determines a target location based on an estimated center of gravity of the particle 104 using the shape of a particle and values of a color or grayscale channel being above a threshold value. In another example, the image processor 130 determines a target location using a distance transform algorithm such as a chessboard transform by calculating a distance from each pixel to the nearest edge of the particle 104 and biasing the target location to the pixel(s) farthest from an edge. Note that any hole or other discontinuity in the particle 104 may create an edge. In another example, the image processor 130 may use 3-D imaging information to select a flat and smooth target location on the particle, provided the target location is sufficiently far from any edge.

The image processor 130 or control unit 108 may use a matrix with cells and arrays of the matrix including [R, G, B] color channel data, and additional information regarding particle location, and particle properties as determined below. The image processor 130 or control unit 108 may alternatively use an imaging library processing tool, such as MATROX, to create a table or other database populated with pixel data for each particle including [R, G, B] values, boundary information, and other particle properties as determined below.

At 206, the control unit 108 adjusts the image and matrix for each region associated with or assigned as a particle 104 to enhance the particle. In other examples, step 206 is omitted, and the method proceeds from step 204 directly to step 208. At step 206, the region of the image or matrix associated with a particle 104 may be modified by the control unit 108 and image processor 130 using various machine vision processing techniques to erode, dilate, fill holes, or otherwise modify or correct the region of the image or matrix associated with the identified particle 104.

Figure 6:
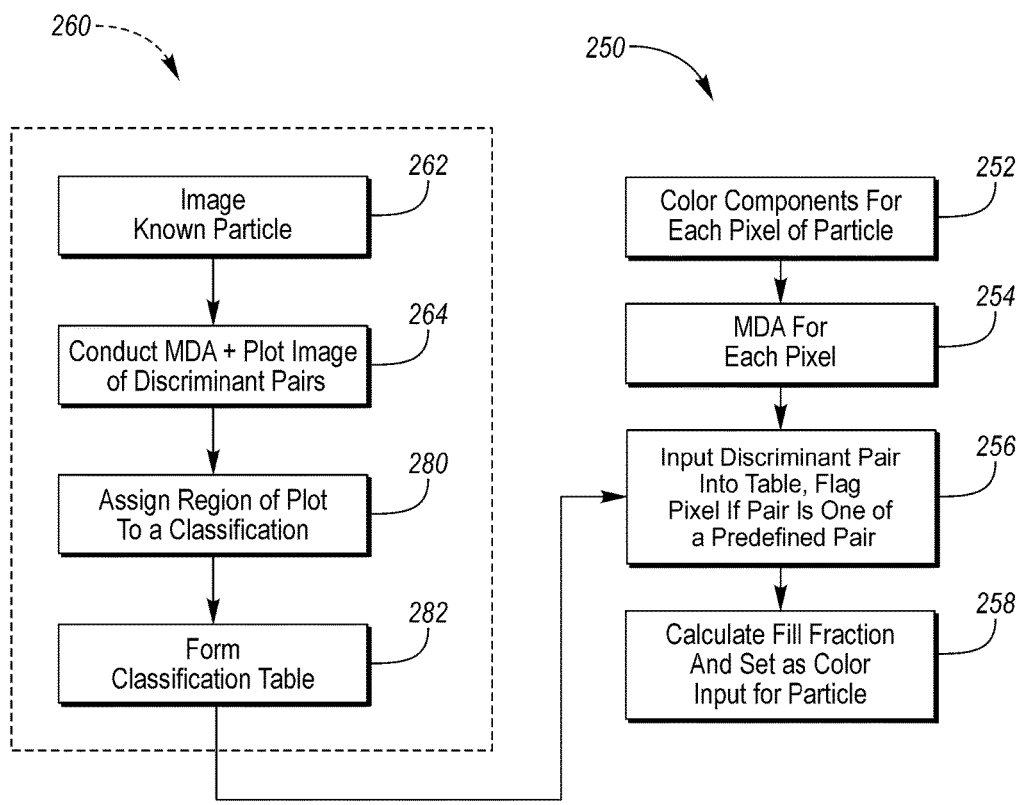
FIG. 6 illustrates a flow chart for a method of providing a color input for use with the method of FIG. 5, with the left side showing the calibration procedure and the right side showing the sortation process.
Figure 9:
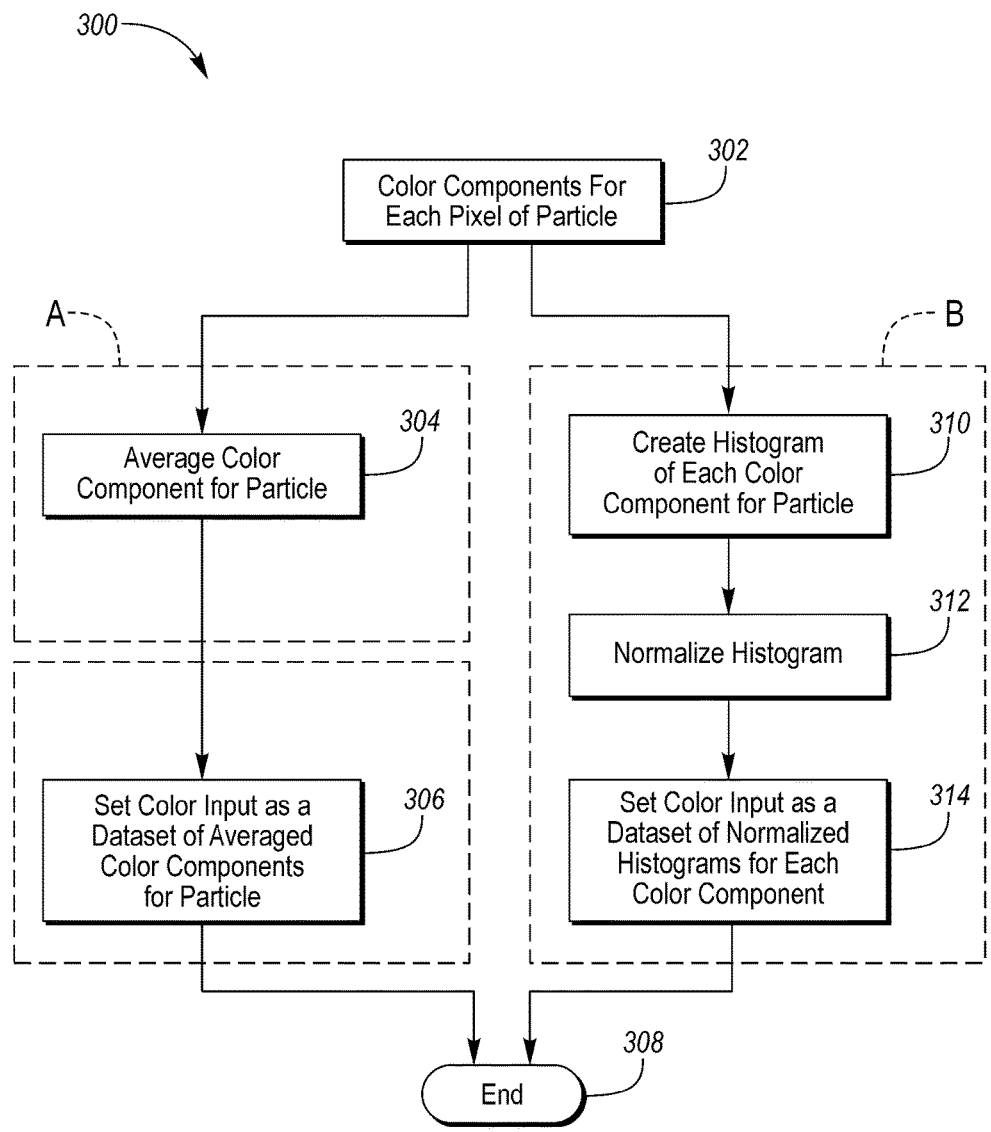
FIG. 9 illustrates a flow chart for a method of providing a color input for use with the method of FIG. 5.

At 208, the control unit 108 calculates a color input for the particle 104 from a color model by using color components for each pixel in the image or cell in the matrix associated with the particle. The control unit 108 may apply color criteria to the pixels of the image or the cells of the matrix associated with the particle 104 to determine the color input for the particle. In other examples, the control unit 108 may evaluate groups of pixels or cells of the image associated with the particle 104. For example, the control unit 108 may analyze the frequency and/or distribution of color components in neighboring pixels or cells in determining an overall color input for the particle 104. FIGS. 6 and 9 below provide examples of methods of determining a color input.

At 210 in FIG. 5, the control unit 108 may compute shape, texture features, a color component standard deviation, a grayscale volume, an aspect ratio, or another visual characteristic of the identified particle from the image or matrix as a visual feature for the particle. Texture features may include rank, dimensionless perimeter (perimeter divided by square root of area), number of holes created by thresholding the particle or by subtracting one rank image from another, total hole area as a proportion of total area, largest hole area as a proportion of area, and Haralick texture features. In other examples, step 210 is omitted, and the method proceeds from step 208 directly to step 212.

The control unit 108 may assign texture values to the particle by transforming the image via a fast Fourier transform (FFT). The average log-scaled magnitude in different frequency bands in the FFT magnitude image may be used as distinguishing texture features At 212, the laser spectroscopic system 110 targets a particle 104 using target location information provided from the visual system 106 and the location or coordinates of the particle 104 on the conveyor 102, and the position of the conveyor 102. The control unit 108 controls the scanner assembly 136 and beam deflectors to direct light pulses generated by the laser system 134 to the particle 104 on the conveyor 102 downstream of the vision system 108 and within the target area of the laser spectroscopic system 110. The control unit 108 controls the laser system 134 and scanner assembly 136 to direct the light beam or a laser shot to the particle in the target area for a predetermined time. The laser spectroscopic system 110 may use shape and feature information from the vision system to identify preferred locations for ablating the particle.

The laser spectroscopic system 110 isolates and measures at least one emitted band of light from the particle 104 in the target area at a selected frequency band using the detector 172 to provide spectral data for the particle associated with a laser shot directed to the particle. The control unit 108 determines the spectral data for the particle 104 based on a signal indicative of a selected frequency band of light emitted from the particle in response to the light beam or laser shot interacting with the particle. Note that a laser shot may include a plurality of laser pulses, and includes four laser pulses for a two laser, double shot laser system.

In other examples, the control unit 108 may control the laser spectroscopic system 110 to direct more than one laser shot to the particle 104, or direct a plurality of sequential laser shots to the particle in the target area. The control unit 108 determines spectral data for each laser shot directed to the particle, such that each laser shot provides distinct spectral data. In another example, the spectral data may be averaged or combined in a way in which the spectral data would not be distinct for each shot. The spectral data may include intensities relating to one or more selected narrow bands of spectral emission recognized by the monochromators or detectors. In one example, spectral data is collected for each one of four laser pulses. The specific spectral lines that are observed, the delay time (gate delay) from the firing of the pulse when observations begin, and the time duration (gate width) during which data is collected, all depend on the elements to be identified in the scrap particles. The spectral data may include any number of emission lines at specified wavelengths and may be based on the desired classifications for the particle 104. For example, the spectral data may include eight element lines, sixteen element lines, or any other number of element lines. The spectral data may be normalized or otherwise modified using a calibration technique. In one example, with PMT detectors 172, the spectral data is provided by a peak value for each line. For multi-shot spectral data from a particle 104, the spectral data for a given line may be compared and averaged, weighted, scored, discarded, or otherwise processed. In another example, with a CCD detector 172, one or more CCD detectors 172 may be provided in various spectral bands, e.g. broadband or ultraviolet to infrared, or any sub-set of the broadband spectra. The spectral data for a particle 104 may be provided using a machine learning algorithm such as a Partial Least Squares Discriminant Analysis (PLSDA) using histograms weighting pixels and comparisons or channels, and the like, a Support Vector Machine (SVM), or another algorithm. The spectral data may be sampled from the monochromators or detectors output at a sampling interval of ten to twenty nanoseconds.

The laser pulses may be separated or spaced in time by the control unit 108 to provide a sufficient waiting period to allow the spectral excitation from the plasma emitted as a result of the previous pulse to subside sufficiently so that the spectral data acquired from the subsequent pulses directed to the particle 104 is not affected by excitation from the previous pulse. For example, the laser pulses may be separated by about 50 microseconds.

At step 214, the control unit 108 generates a data vector for the particle 104 for the laser shot that contains both the color input and the spectral data. The vector may also include additional visual data associated with the particle, for example, one or more visual features as determined at step 210.

At step 216, the control unit 108 classifies the particle 104 into one of at least two classifications of a material as a function of the data vector by inputting the data vector into a machine learning algorithm. The control unit may use a Support Vector Machine (SVM), a Partial Least Squares Discriminant Analysis (PLSDA), a neural network, a random forest of decision trees, or another machine learning and classification technique to evaluate the data vector and classify the particle 104. In one example, a neural network is used to classify each of the scrap particles 104 as one of a preselected list of alloy families or other preselected list of materials based on elemental or chemical composition based on the analysis of spectral data and color input data.

The spectral data may be analyzed at 216 for the multiple pulses for each particle 104 in one or more data vectors. For example, the spectral data for two categories of particles may be distinguished and sorted by isolating one or two spectral bands and utilizing simple ratioing techniques by comparing the intensities of one or more analyte spectral lines to the intensity of a reference line, and then comparing these ratios to different ranges of values corresponding to different alloys to categorize the particle in conjunction with the color input in the data vector.

In an example, when sorting several categories of particles 104 that have similar constituents, such as several different aluminum alloys, the method may use a complex classification regime, such as a neural network, which uses the data vector which includes a plurality of selected spectral lines, the color input, and may include other particle characteristics such as shape, texture, and the like to categorize the particles. The data vector may also include other data for use in classifying the particle such as inputs from the monochromator including a value corresponding to the amount of scattered radiation at the operating wavelength of the lasers and the selected emission lines monitored by other monochromators/detectors, laser energy produced, and particle location on the conveyor.

For a control unit 108 implementing a neural network for classifying the particle 104 using the data vector, the neural network program may be "trained" to "learn" relationships between groups of input and output data by running the neural network through a "supervised learning" process. The learned relationships may then be used to predict outputs and categorize a scrap particle 104 using a data vector containing spectral data such as emission intensities and scatter produced from representative samples of scrap having known chemistry, a color input, and other particle characteristic data. An example of a neural network is shown and described below with reference to FIG. 11. The neural network may be configured to provide a known generalized functional relationship between sets of input and output data. Algorithmic techniques such as back propagation and competitive learning may be used to estimate the various parameters or weights for a given class of input and output data.

In order to combine LIBS and machine vision classification, each may separately provide a score for each material to be separated, and then the scores combined in a separate final step. Alternately, the data vectors from LIBS and machine vision may be appended, forming a single longer data vector, before applying the classifier, which may be a neural network, PLSDA, SVM, Discriminant Analysis, or other machine learning and classification method. In the former approach, different techniques can be used for the LIBS, machine vision, and final combination steps. For example the LIBS data may be evaluated with PLSDA to generate a numeric score for each class of material, while the Vision data is evaluated with Multiple Discriminant Analysis to generate a score for each class; then these scores may be evaluated by a Support Vector Machine to generate the final classification.

In one example, the classification of a particle 104 may be a multiple stage classification. For example, a binary SVM may be used to classify two larger groups of materials in a binary sort, and then a PLSDA may be used with each group to classify individual metals within each group of materials. In one example, these multiple stages may be used with only the LIBS data vector, even before combining the result with Vision data. In another example, both LIBS and Vision data (as a single long vector) may be used in each stage, in which case the result is a final decision.

At step 218, the control unit 108 may arbitrate multiple classifications for a particle 104 if the particle is interrogated by more than one laser shot and/or is interrogated at more than one target location, as each laser shot may results in an associated classification. The control unit 108 combines the classification verdicts for all laser shots on each particle 104 to reach a final classification decision using one of a number of arbitration techniques, including a weighted average of scores, or voting, or other methods known in the art of machine learning.

For example, when two laser shots are directed to the same particle 104, a data vector may be generated for each laser shot using the color input and the spectral data from the associated laser shot. The particle 104 is classified into one of the at least two classifications of the material as the function of the corresponding vector for each shot, such that the particle has two associated classifications. The control unit 108 then arbitrates the two classifications for the particle 104 from each of the two shots to determine an overall classification for the particle 104.

At step 220, the control unit 108 controls the separator unit 112 to selectively activate an ejector to eject a particle into a desired bin based on the classification for the particle. The control unit 108 controls the ejectors based on the classification of the particle that is assigned to the cells in the matrix associated with the particle and based on the position and timing of the conveyor.

FIG. 6 illustrates a method 250 employed by the control unit 108 to determine the color input for the particle at step 208 of FIG. 5. In other embodiments, various steps in the method 250 may be combined, rearranged, or omitted. In one example, control unit 108 uses the method 250 to calculate the color input for the particle from the color model.

At 252, the control unit 108 receives the color components from each pixel of the image or cell of the matrix associated with the particle. Each pixel of the image may have three or more color components, for example, the three RGB channels as described above. For each pixel of each identified particle 104, the control unit 108 therefore obtains the color components, e.g. R, G, B; or H, S, V; or other color space bases such as those from multispectral camera data with more than 3 color components.

At 254, the control unit 108 employs a multiple discriminant analysis (MDA) to reduce the three (or more) color components or dimensions down to two color components that provide a pair of discriminants. The control unit 108 uses the MDA to identify the more relevant two color components for each pixel based on the two classifications and materials to be sorted. The control unit 108 may conduct more than one MDA for the pixels or cells associated with the particle 104 for multiple classifications. Each MDA is used to classify all of the particles 104 into two groups; i.e. it is used for a binary classification.

At 256, the control unit 108 inputs the pair of discriminants provided by the two color components identified for each pixel or cell associated with the particle using the MDA into a calibration table, calibration chart, look-up table, or the like stored in a memory unit associated with the control unit. The control unit 108 determines if the pair of discriminants is a predefined pair of discriminants in the calibration table. If the pair of discriminants is one of a series of predefined pairs of discriminants, as determined via a calibration process described below, the control unit 108 flags the pixel or cell in the image, for example, with a 1 value. If the pair of discriminants is not one of the series of predefined pairs of discriminants, the control unit 108 leaves the pixel or cell in the image unflagged, for example, as a 0 value.

At 258, the control unit 108 calculates a color input for the particle 104. The control unit 108 sums all of the flagged pixels or cells associated with the particle 104 to provide a summation of the flagged pixels. The control unit 108 calculates the total number of pixels or cells associated with the particle 104. The control unit 108 calculates a fill fraction for the particle 104 by normalizing or dividing the summation of the flagged pixels by the total number of pixels associated with the particle. The control unit 108 then sets the fill fraction as the color input for the particle 104 into the data vector.

The control unit 108 may provide more than one color input for the particle 104 by repeating the method 250 and using another two color components from the particle as another pair of discriminants into another calibration table to determine a second fill fraction and second color input for the particle. And so forth: the control unit 108 may calculate a third color input for the particle 104 using a third pair of discriminants, a third calibration table, and third fill fraction; etc. The first pair of discriminants for a first color input determination has at least one different color component compared to a second pair of discriminants for a second color input determination. For example, [R, G] may be used as a pair of discriminants for a first color input, and [R, B] or [G, B] may be used as another pair of discriminants for a second color input. One of the color components in a pair of discriminants may be another value such as grayscale, brightness, and the like. If more than one fill fraction and associated color input is determined for the particle, each color input may be a separate scalar value that is included in the data vector in method 200. One common reason for adding second, third, etc. pairs of discriminants would be to distinguish between more than two materials. However, additional pairs of discriminants along with associated calibration tables and fill fractions might help to improve the accuracy of a simple binary classification.

A calibration method 260 is shown in FIG. 6 to provide the calibration or look up table for use in step 256.

At 262, first and second particles formed from known materials of each of the selected classifications for the binary MDA is imaged using the same vision system 106 as used in system 100, which includes the same imaging device and lighting conditions. The images of the particles may be processed for example, using steps 202, and/or 206 in method 200. The control unit 108 receives the color components from each pixel of the image or cell of the matrix associated with the known particle. Each pixel of the images may have three or more color components such that the control unit 108 receives the color components, e.g. R, G, B; or H, S, V; etc.

Figure 7:
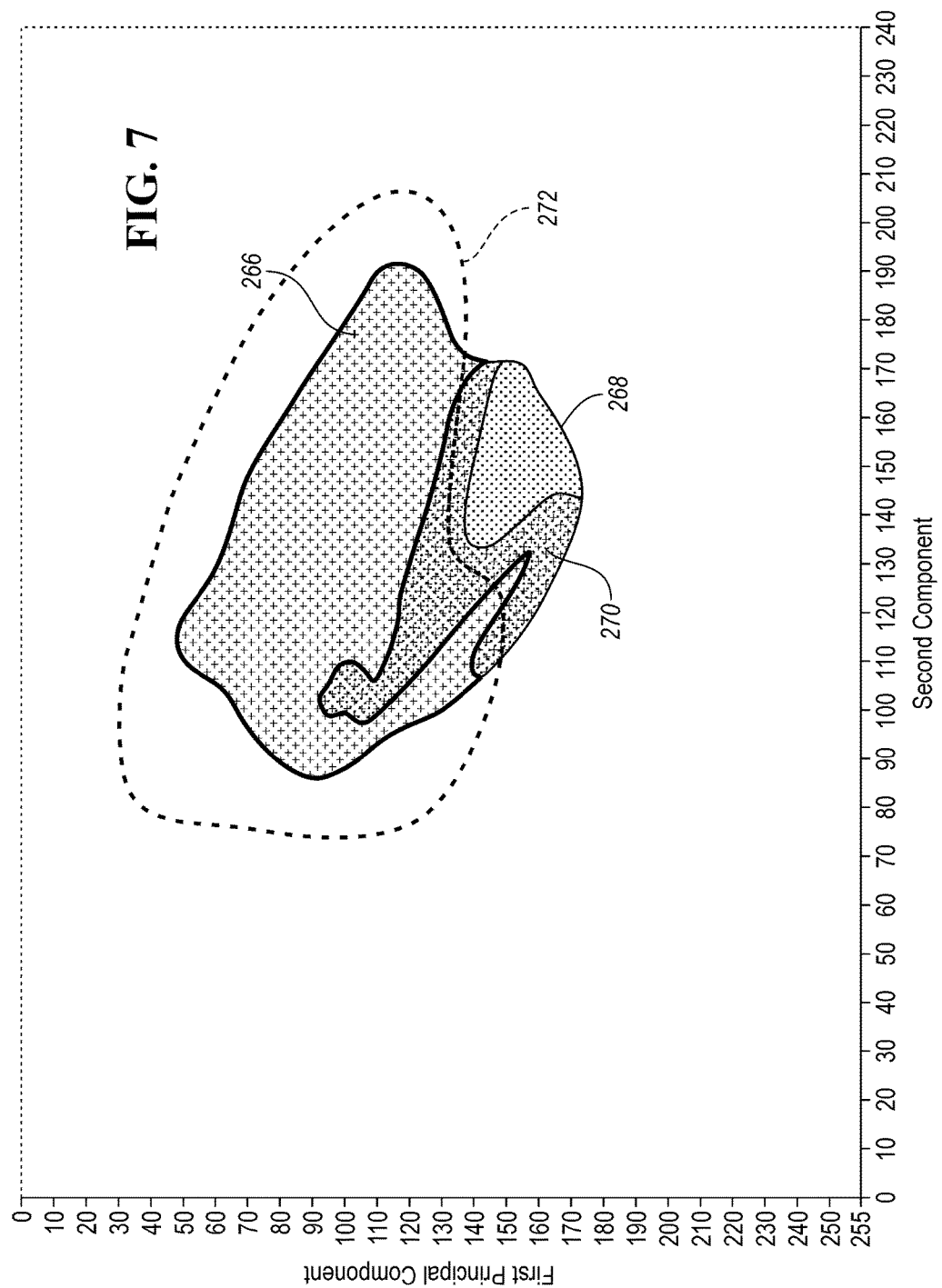
FIG. 7 illustrates a calibration table for use with the method of FIG. 6.

At step 264, an MDA is conducted for the images to reduce the three (or more) color components or dimensions down to two color components to provide a pair of discriminants for each pixel or cell for each particle. The control unit 108 uses the MDA to identify the more relevant two color components for each pixel. The pairs of discriminants are then plotted by the control unit 108, as shown in FIG. 7. The plot may be viewable to a user, for example, via the displays and HMI of the control unit.

FIG. 7 plots the pairs of discriminants, as shown by a first color component or first discriminant on one axis and a second color component or second discriminant on the other axis, with each axis having a range of 0-255. The pairs of discriminants from the first particle, or associated with the first classifications fall within region 266. The pairs of discriminants from the second particle, or associated with the second classification fall within region 268. Note that the two regions 266, 268 may overlap in one or more contiguous areas, as shown by region 270. At step 280 of method 260, region 272 is drawn or selected as a contiguous region by the user and assigned to the targeted classification of material, or one of the classifications in a two classification binary sort, e.g. for the first particle material. The region 272 may be a single contiguous region, or region 272 may include more than one contiguous region assigned by the user for a classification. As the user selects the region 272, the resulting look-up table or calibration table may be non-linear, which allows for additional flexibility for the classification process.

In the present example, the pairs of discriminants may only be plotted if they occur in at least three pixels or cells associated with the particle. In other examples, the pairs of discriminants may be plotted or input to the table if they occur in at least one pixel or cell of the particle image, or in more than four pixels or cells of the particle image.

The fill fraction may be calculated as the percentage of pixels or cells of the particle that fall with the region 272. At step 282, the control unit 108 saves the calibration or look-up table with the predefined sets of discriminant pairs that are associated with a classification and are in defined region 272.

Figure 8:
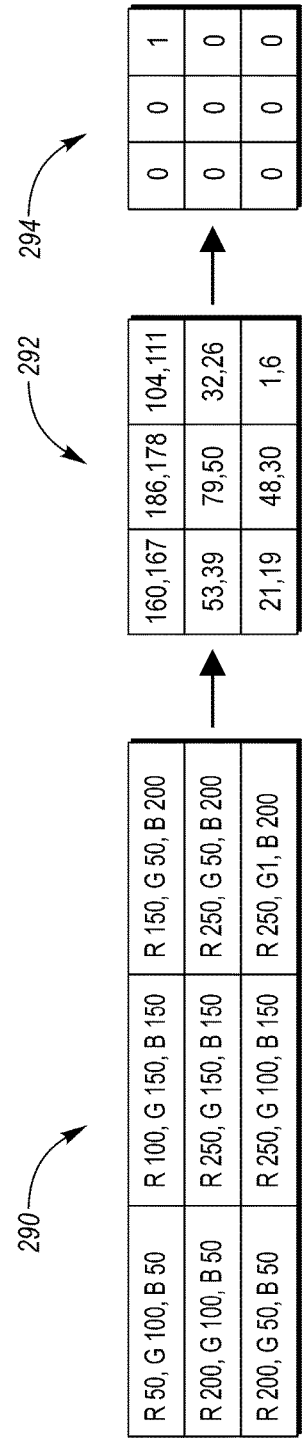
FIG. 8 illustrates a simplified example of a particle image and the steps associated with the method of FIG. 6.
Figure 4:
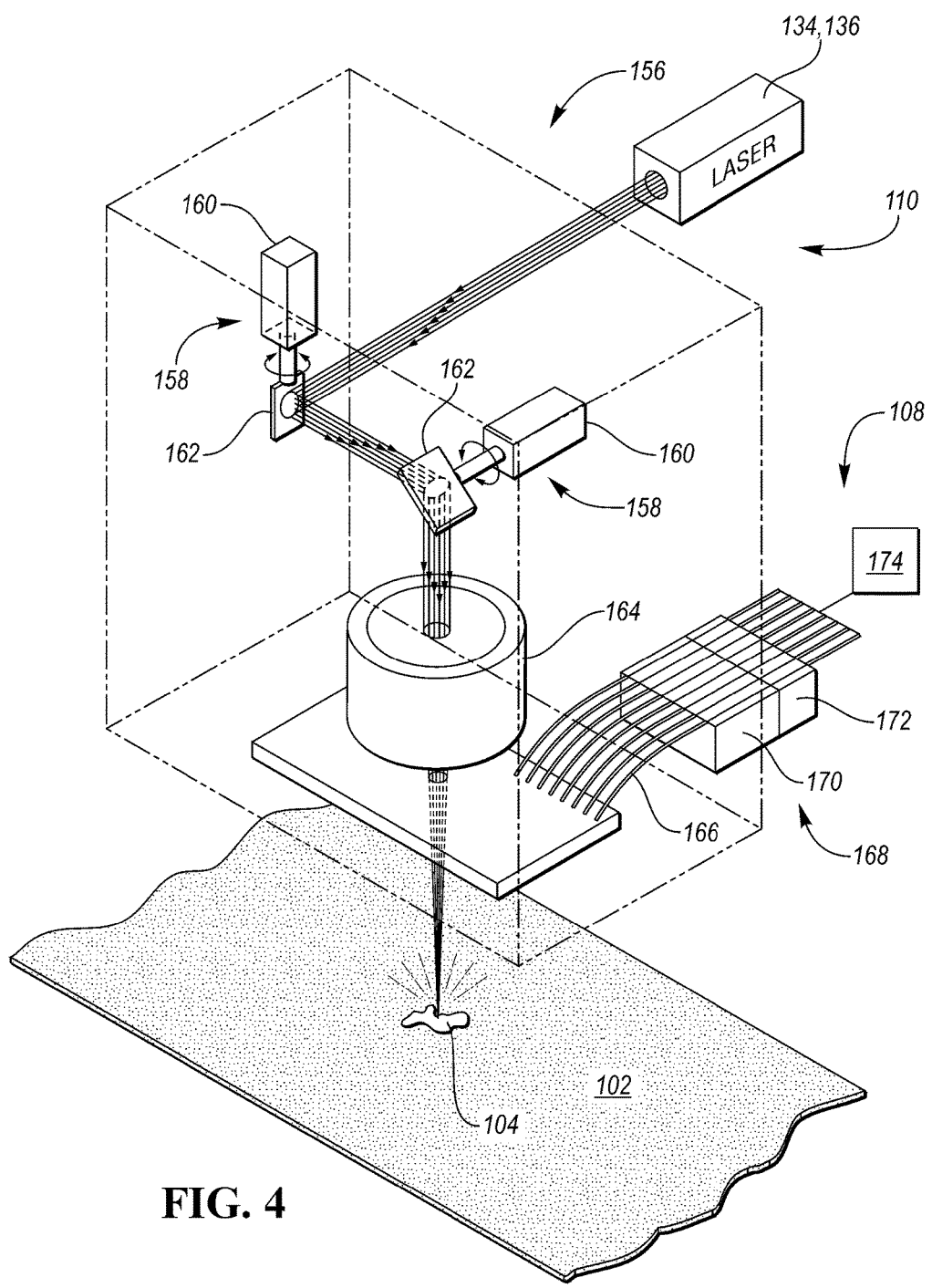
FIG. 4 illustrates a perspective schematic view of the laser system for use with the sorting system of FIG. 1.

FIG. 8 illustrates a simplified example of a fill fraction calculation for a particle. Matrix or array 290 represents an image of a particle. The image of the particle includes 9 total pixels, although arrays of other sizes are contemplated for use with the present disclosure. Each cell or pixel in the image has an associated R, G, and B value, as shown in the Figure. Image 290 corresponds with step 252 in method 250.

The control unit 108 processes the image 290 at step 254, which results in a discriminant pair for each pixel in the image. Representative discriminant pairs are listed for each pixel in matrix 292. In one example, the first component of the discriminant pair is calculated as a function of the [R, G, B] values for the associated pixel, and may be based on an equation such as $aR+bG+cB+d$, where a, b, c, and d are constant values. In the example, the second component of the discriminant pair is calculated as another function of the [R, G, B] values for the associated pixel, and may be based on an equation such as $eR+fG+gB+h$, where e, f, g, and h are constant values.

Each of the discriminant pairs in matrix 292 are inputted into a lookup table at step 256. In the present example, each of the discriminant pairs in matrix 292 are entered into the lookup table shown in FIG. 7. If the pair of discriminant is one of a series of predefined pairs, such as those in region 272, a value of one is assigned to the cell. If the pair of discriminants is not one of the predefined pairs, a value of zero is assigned to the cell. The results of entering matrix 292 into the lookup table of FIG. 7 is illustrated in matrix 294.

The control unit 108 may then calculate a fill fraction for the particle. In the present example, the fill fraction of the particle is 0.111 based on one cell of nine total cells having a flagged value. The fill fraction may then be provided to the data vector for the particle for use in classification. In further examples, the control unit 108 may additionally compare the calculated fill fraction to a threshold value. For example, as the particle's fill fraction is below a threshold value of 0.65, the control unit 108 may determine that the particle is not of a classification associated with the fill fraction above the threshold value.

The control unit 108 may additionally extract further parameters, such as texture and other particle and image data for use in the data vector. For example, the image 290 in FIG. 8 has a perimeter of 8 pixels, and an area of 9 pixels. The image 290 also has the following texture features: a rank of 69.0, a perimeter over the square root of the area (P/sqrt(A)) of 2.667, zero holes, zero pixels as the largest hole area, and zero pixels as the total hole area for the image. Additional parameters and texture features may also be extracted from the image for use in the data vector and classification of the particle.

FIG. 9 illustrates a method 300 employed by the control unit 108 to determine a color input for the particle 104 at step 208 of FIG. 5. In other embodiments, various steps in the method 300 may be combined, rearranged, or omitted. In one example, control unit 108 uses the method 300 to calculate the color input for the particle from the color model.

At 302, the control unit 108 receives the color components from each pixel of the image or cell of the matrix associated with the particle 104. Each pixel of the image may have three or more color components, for example, the three RGB channels as described above. For each pixel of each identified particle, the control unit 108 therefore obtains the color components, e.g. R, G, B; or H, S, V; or other color space bases such as those from multispectral camera data with more than 3 color components.

The method may provide a color input via a first variation A of method 300 or a second variation B of method 300.

For variation A, the method proceeds from block 302 to block 304. At block 304, the control unit 108 averages each color component across all of the pixels or cells associated with and identified as the particle. For example, the control 108 unit may average the R values for all pixels associated with the particle, the B values for all pixels associated with the particle, and the G values for all pixels associated with the particle, resulting in a color dataset for the particle with three scalar values, as $[R_{average}, B_{average}, G_{average}]$. In other examples, the control unit 108 may calculate average color component values for the particle based on another color model or space, such as HSV, etc.

At step 306, the control unit 108 sets the color input for the particle 104 as the dataset identified in step 304, and proceeds to step 308 where the method 300 ends, and the color input is used with method 200.

In an example, the control unit 108 applies method 300, variation A to the particle image 290 as shown in FIG. 8. The control unit 108 calculates the $[R_{average}, B_{average}, G_{average}]$ values for the particle as shown at step 304 using the image 290 in FIG. 8, which in the present example, results in a color dataset for [$R_{average}$, $B_{average}$, $G_{average}$] Of [189, 83, 133].

For variation B, the method proceeds from block 302 to block 310. At block 310, the control unit 108 creates a histogram for each color component of the particle 104, such that there is an R histogram, a G histogram, and a B histogram for a particle using a RGB color space. Alternatively, the control unit 108 creates a single histogram for the particle 104 with three sets of bins, with each set of bins associated with a different color component of the color space. In one example, 8-bit color components are used for the histogram, such that the bins for a color component have an associated value that falls within one of the bins. For example, with an 8-bit Red component, the R value of a pixel or cell in the image would fall into one of 10 bins having a range of 0-25, 26-50, . . . , and 230-255. For a single histogram using the RGB color space, the resulting histogram therefore has thirty bins. Of course, the bins may be defined otherwise, for example, for a 16-bit color, a 32-bit color, as bins with unequal ranges or different sizes, and the like.

The control unit 108 examines each pixel of cell of the image associated with the particle 104, and bins the values of the color components for that pixel by increasing the appropriate histogram bin value by one. The control unit 108 repeats this for all of the pixels or cells associated with the particle.

Once the histogram(s) are populated based on the particle color data, the control unit 108 may normalize the histogram(s) at step 312 by the area of the particle 104 on the image. The area of the particle 104 may be calculated by the control unit by summing the number of pixels or cells that are identified as the particle or associated with the particle.

At step 314, the control unit 108 sets the color input for the particle 104 as the histogram identified in step 312. The color input is therefore a dataset containing a number of scalar values based on the values associated with each bin. In one example, the normalized histogram contains 30 bins based on an 8-bit RGB color space, and the color input would therefore be a dataset with 30 normalized scalar values. The method 300 then proceeds to step 308 where the method 300 ends, and the color input is used with method 200.

Figure 10:
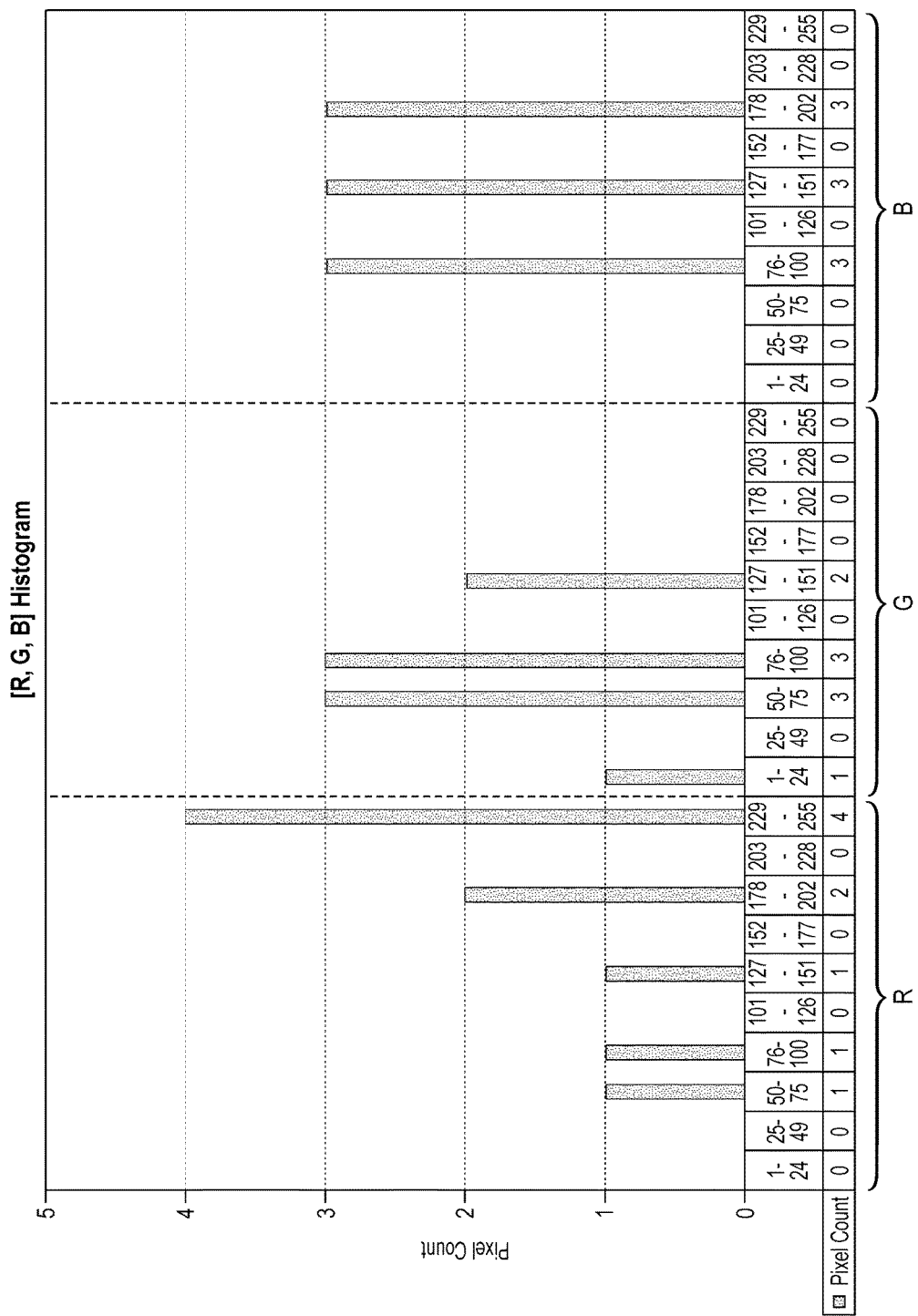
FIG. 10 illustrates a histogram resulting from the simplified example of a particle image from FIG. 8 using the steps associated with the method of FIG. 9.

In an example, the control unit 108 applies method 300, variation B to the particle image 290 as shown in FIG. 8. The control unit 108 creates a histogram as shown in FIG. 10, using step 310, with the [R, G, B] values of each pixel in the image 290 appropriately assigned to a bin of the histogram. For example, only one pixel in image 290 has a R value between 50-75, and therefore the associated bin count is one. The histogram as shown in FIG. 10 may further be normalized by the control unit 108 at step 312, and the normalized or unnormalized histogram is provided as the color input at step 314.

Figure 11:
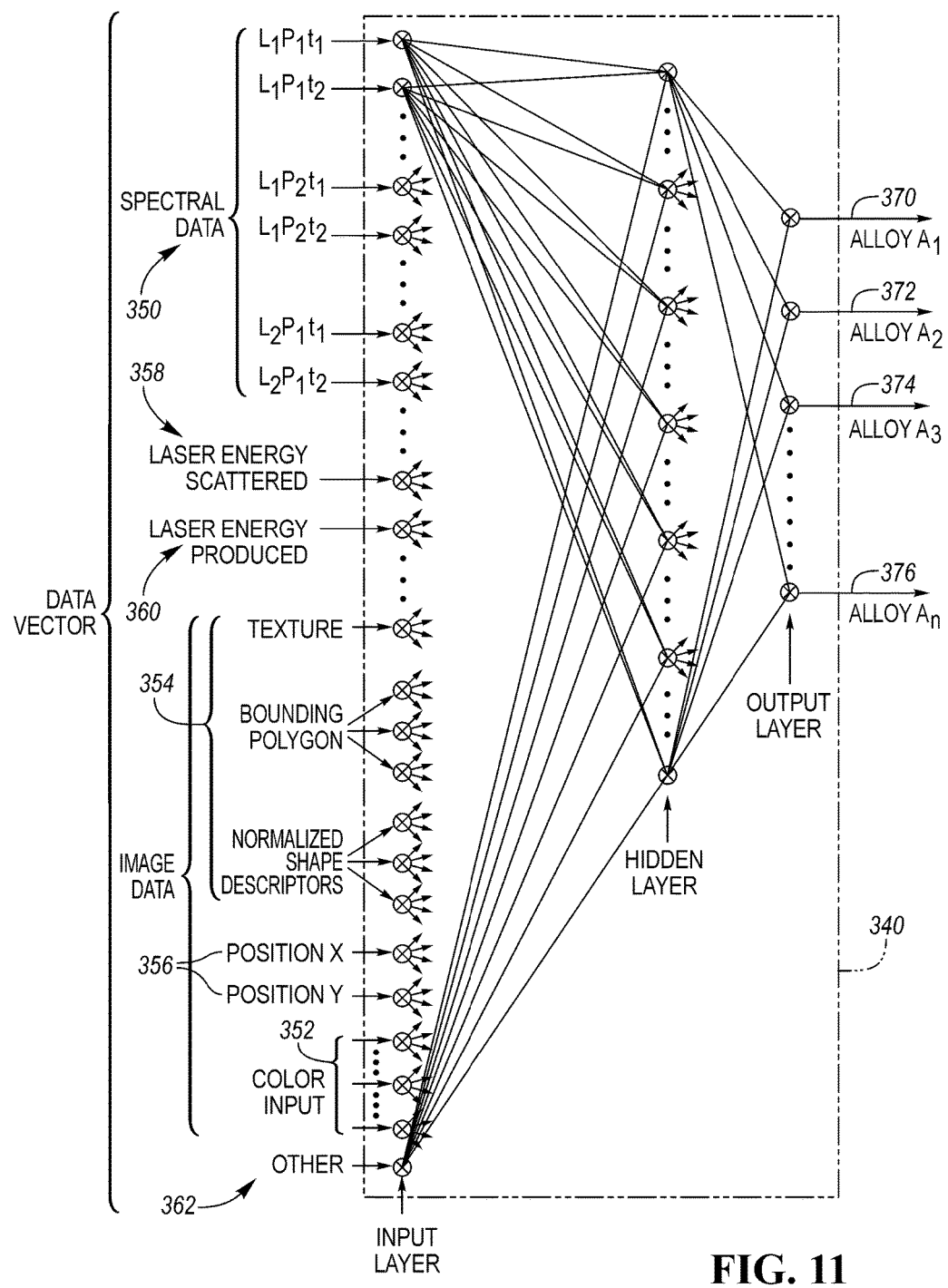
FIG. 11 illustrates a neural network for use in classifying the particle using a data vector and the method of FIG. 5.

The particle may be classified using a data vector that incorporates both color data and spectral data according to the present disclosure, and as described with respect to the method of FIG. 5. In one example, the method illustrated in FIG. 5 inputs the data vector into a neural network at step 216 to classify the particle. A diagram of a neural network for use with the method of FIG. 5 is illustrated in FIG. 11. The neural network program may be "trained" to "learn" relationships between groups of input and output data by running the neural network through a "supervised learning" process. The relationships thus learned could then be used to predict outputs (i.e., categorize each of the scrap particles) based upon a given set of inputs relating to, for example, color and spectral inputs produced from representative samples of scrap having known chemistry.

In FIG. 11, the control unit 108 uses a neural network 340 and analyzing/decision-making logic to provide a classification scheme for selected scrap materials to classify the materials using a binary classification system, or classify the particle into one of three or more classifications. Commercially available neural network configuration tools may be employed to establish a known generalized functional relationship between sets of input and output data. Known algorithmic techniques such as back propagation and competitive learning, may be applied to estimate the various parameters or weights for a given class of input and output data.

The neural network 340 uses the data vector determined at step 214 as the input to the neural network, with the data vector containing color input data, spectral data, etc. As described above, the data vector includes spectral data from the LIBS, as well as a color input. The data vector may contain additional data representative of other particle or system parameters.

As illustrated in FIG. 11, the neural network 340 has inputs from the data vector that are based on the spectral data obtained during the LIBS process. In one example, the spectral data includes sixteen lines, with each line represented by an intensity value. In other examples, the spectral data may include a greater or fewer number of spectral lines based on the desired classifications of materials, or associated with different laser pulses in the stream of laser pulses. The data vector provided to the neural network therefore includes the spectral data acquired by the control unit from the light distribution and spectral analysis system 28 as data inputs. For example, the multiple inputs 350 corresponding to the spectral data for a selected particle might include a series of data inputs corresponding to intensity readings from a detector for a selected spectral band (L) over a selected period of time (t) following the first pulse (P) (L1P1$t$1, L1P1$t$2 . . . L1P1$t$n), data corresponding to detector readings for the same selected band following the second pulse (L1P2$t$1, L1P2$t$2 . . . L1Pz$t$n), and similar data inputs for that selected spectral band for each additional pulse directed to the particle (L1Pn$t$1, L1Pn$t$2 . . . L1Pz$t$n), as well as additional of these sets for each of the selected bands (L2P1$t$1 . . . LZPn$t$n, LnPl$t$1 . . . LnPn$t$n), and so on.

The neural network 340 has inputs from the data vector that are based on the color input 352 for the particle contained in the data vector. In one example, the color input 352 is a fill fraction scalar value determined for the particle, as described with respect to FIG. 6. Alternatively, the color input 352 may be a dataset of an averaged [R, G, B] values for the particle, as shown and described with respect to FIG. 8, variation A. The color input 352 may also be a dataset of scalar values based on normalized bin values from a histogram, for example with 30 bin values provided as the color input in the data vector, as shown and described with respect to FIG. 8, variation B.

The neural network 340 has inputs from the data vector that are based on other image characteristics 354 for the particle contained in the data vector, for example, as determined at step 210 including shape, texture, and other characteristics.

The neural network 340 may also be provided with a variety of other desired inputs, including data relating to laser energy scattered 358, and data related to laser energy produced 360. The position of the particle on the belt may be provided to the neural network as a part of the data vector, as indicated by position X and position Y at 362. Similarly, other inputs 362 deemed influential to the decision-making process may be included in the data vector.

As previously described, using known neural network programming techniques, the network can be trained by providing sets of the inputs along with the desired one of possible outputs 370-376. Once the specific functional relationships between the inputs and outputs are obtained, the network may be used with new sets of input to predict output values. It will be appreciated that once developed, the neural network may incorporate information from a multitude of inputs into the decision-making process to categorize particles in an efficient manner.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of sorting scrap particles comprising:
   imaging a moving conveyor containing scrap particles using a vision system to create an image of the conveyor containing scrap particles, the image corresponding to a timed location of the conveyor;
   employing a control unit executing instructions to analyze the image as a matrix of cells;
   employing the control unit executing instructions to identify cells in the matrix containing a particle by distinguishing the particle from a background indicative of the conveyor;
   employing the control unit executing instructions to calculate a color input for the particle from a color model by determining color components for each cell in the matrix associated with the particle;
   generating and directing a light beam to the particle on the conveyor downstream of the vision system and within a target area using a scanner assembly including a beam deflector;
   isolating and measuring at least one emitted band of light from the particle in the target area at a selected frequency band using a detector to provide a signal indicative of spectral data for the particle to the control unit;
   employing the control unit executing instructions to generate a data vector for the particle containing the color input and the spectral data; and
   employing the control unit executing instructions to classify the particle into one of at least two classifications of a material as a function of the data vector.

2. The method of claim 1 wherein calculating the color input for the particle further comprises averaging at least one color component for the particle across the cells in the matrix associated with the particle.

3. The method of claim 1 wherein calculating the color input for the particle further comprises averaging three color components for the particle across the cells in the matrix associated with the particle.

4. The method of claim 1 wherein calculating the color input for the particle further comprises assigning a color component of each cell in the matrix associated with the particle into a bin to obtain a histogram of each color component for the particle.

5. The method of claim 4 wherein each histogram is normalized by an area of the particle determined by a number of cells in the matrix associated with the particle.

6. The method of claim 1 wherein the color input comprises at least three color components.

7. The method of claim 1 further comprising employing the control unit executing instructions to reduce noise on the image by: transforming the image via a fast Fourier transform to create a representation of the image in a frequency domain, removing at least one specified frequency from the representation, and transforming the representation back to the image via an inverse fast Fourier transform.

8. The method of claim 1 wherein the particle is identified on the matrix by applying a threshold on at least one channel of the matrix and flagging a cell when a value of the at least one channel exceeds the threshold to indicate the presence of a particle.

9. The method of claim 1 further comprising employing the control unit executing instructions to determine at least one feature of the particle from the matrix, a feature including a texture, a shape, a color component standard deviation, and a grayscale volume;
   wherein the data vector is further generated using the control unit executing instructions to contain the at least one feature.

10. The method of claim 1 wherein the control unit is employed to generate instructions to classify the particle into one of the least two classifications of the material as the function of the data vector by inputting the data vector into a machine learning algorithm.

11. The method of claim 10 wherein the machine learning algorithm comprises at least one of a support vector machine, a partial least squares discriminant analysis, a neural network, a partial least squares discriminant analysis, a random forest of decision trees.

12. The method of claim 1 wherein the light beam is a laser shot directed to the particle in the target area for a predetermined time.

13. The method of claim 1 wherein the light beam is a plurality of sequential laser shots directed to the particle in the target area;
   wherein a corresponding data vector is generated for each laser shot using the color input and the spectral data from the associated laser shot by the control unit executing instructions; and
   wherein the particle is classified by the control unit executing instructions into one of the at least two classifications of the material as the function of the corresponding data vector for each shot, and the classifications associated with each of the plurality of shots are arbitrated by the control unit executing instructions to determine an overall classification for the particle.

14. The method of claim 1 further comprising employing the control unit executing instructions to transform the image via a fast Fourier transform (FFT) and create a one-dimensional array representing an average of a log-scaled magnitude in different frequency regions in the FFT image to represent texture information associated with the particle.

15. The method of claim 1 further comprising targeting the light beam on a region of the particle based on a chessboard distance transform applied to the image.

16. The method of claim 1 further comprising sorting the particle by controlling a separator device based on the classification for the particle and the timed location of the conveyor.

17. The method of claim 1 wherein each cell in the matrix corresponds to a pixel in the image.

18. The method of claim 1 wherein employing the control unit executing instructions to calculate the color input for the particle from the color model by determining color components for each cell in the matrix associated with the particle further comprises employing the control unit executing instructions to: input two color components from each cell of the matrix associated with the particle as a pair of discriminants into a calibration table, flag the cell if the pair of discriminants is one of a predefined pair of discriminants, and calculate the color input by normalizing a summation of the flagged cells by a total number of cells associated with the particle.

19. The method of claim 18 wherein the color input is a first color input, the method further comprising:
  employing the control unit executing instructions to calculate a second color input for the particle by inputting another two color components from each cell associated with the particle as another pair of discriminants into another calibration table;
  wherein at least one of the color components of the first color input differs from at least one of the another color components of the second color input; and
  wherein the control unit is employed to execute instructions to generate the data vector for the particle containing the first color input, the second color input, and the spectral data.

20. The method of claim 18 further comprising employing the control unit executing instructions to create the calibration table via a calibration process using a known particle from one of the at least two classifications by:
  imaging the known particle and conducting a multiple discriminant analysis of the color components of each cell of the image of the known particle to provide two discriminants, and
  assigning at least one contiguous region of a plot of the two discriminants to the one of the at least two classifications of the material to define a set of predefined pairs of discriminants for the one of the at least two classifications of the calibration table.

* * * * *